United States Patent [19]

Itagaki

[11] Patent Number: 5,251,506
[45] Date of Patent: Oct. 12, 1993

[54] COVER MATERIAL FOR STEERING WHEEL OF VEHICLE AND MANUFACTURING METHOD THEREOF

[75] Inventor: Toshio Itagaki, Souka, Japan

[73] Assignee: Midori Anzen Kogyo Co., Ltd., Tokyo, Japan

[21] Appl. No.: 750,578

[22] Filed: Aug. 27, 1991

[30] Foreign Application Priority Data

Sep. 7, 1990 [JP] Japan ............................ 2-93600[U]
Nov. 16, 1990 [JP] Japan ........................ 2-119273[U]
Nov. 16, 1990 [JP] Japan ........................ 2-119372[U]
May 2, 1991 [JP] Japan ............................. 3-40103[U]

[51] Int. Cl.$^5$ .......................... B62D 1/06; G05G 1/10
[52] U.S. Cl. .......................... 74/558; 150/154
[58] Field of Search .................... 74/558; 150/154

[56] References Cited

U.S. PATENT DOCUMENTS

| | | | |
|---|---|---|---|
| 2,157,950 | 5/1939 | Best | 74/558 |
| 2,618,987 | 11/1952 | Goldstine | 74/558 |
| 4,179,950 | 12/1979 | Valley | 74/558 |
| 4,729,416 | 3/1988 | Miller | 74/558 X |
| 4,782,872 | 11/1988 | Moschini | 74/558 X |
| 4,800,776 | 1/1989 | Strongwater | 74/558 |

FOREIGN PATENT DOCUMENTS

| | | | |
|---|---|---|---|
| 63-176773 | 7/1988 | Japan | 74/558 |
| 63-176774 | 7/1988 | Japan | 74/558 |
| 63-188565 | 8/1988 | Japan | 74/558 |
| 3-54075 | 3/1991 | Japan | 74/558 |
| 516269 | 7/1938 | United Kingdom | |

*Primary Examiner*—Leslie A. Braun
*Assistant Examiner*—David E. Henn
*Attorney, Agent, or Firm*—Marger, Johnson, McCollom & Stolowitz

[57] ABSTRACT

In a cover material for a steering wheel of a vehicle and a method of manufacturing the cover material, an central body portion of the cover material has a peripheral length in a plane extending perpendicularly to an axis of the steering wheel, which is substantially identical with that of an outer peripheral section of the steering wheel. A pair of side skirts extend radially inwardly respectively from both side edges of the central body portion. The central body portion and the pair of side skirts cooperate with each other to define therein an annular space into which the steering wheel can be fitted. The central body portion and the pair of side skirts have their respective lengths in a plane including the axis of the steering wheel, whose total is substantially identical with an outer peripheral length of the steering wheel in the plane including the axis of the steering wheel. Ruffling is applied to each of the pair of side skirts along a radially inward edge thereof, to form pleats along the radially inward edge of the skirt.

29 Claims, 7 Drawing Sheets

COVER MATERIAL FOR STEERING WHEEL OF VEHICLE AND MANUFACTURING METHOD THEREOF

BACKGROUND OF THE INVENTION

The present invention relates to a cover material for a steering wheel of a vehicle such as an automobile, a motorboat or the like, and to a method of manufacturing the cover material.

Figure 20:
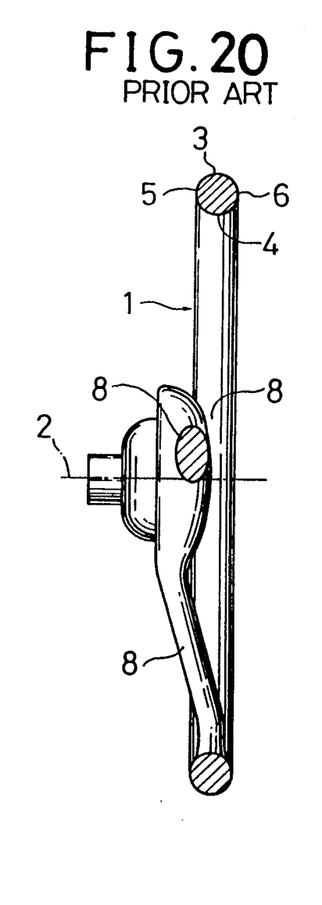
FIG. 20 is a cross-sectional view of a conventional steering wheel for a vehicle.

Referring first to FIG. 20 of the attached drawings, there is shown a conventional steering wheel 1 for a vehicle such a- automobile, a motorboat or the like. The steering wheel 1 has an inner hub 2a and an outer rim 2b which are connected by one or more spokes 8. The outer rim 2b may be thought of as having side surface 5 and 6 extending between an inner surface 3 and an outer surface 4. It is to be noted that, although rim 2b illustrated in FIG. 20 has a circular cross-section it may instead have a rectangular or polygonal cross-section. It is further to be noted that, although rim 2b illustrated in FIG. 20 is substantially circular and continuous, the rim may be oblong or of another arcuate shape, and may be divided into two or more sections.

Conventionally, a cover material of the kind referred to above has been manufactured in the following manner. A material such as natural leather, synthetic leather or cloth is first cut into a web-like or strip-like shape having a length substantially identical with an outer surface 4 of a steering wheel rim and a width equal to the circumference of the rim. The strip-like material is wrapped about the steering wheel rim so that the longitudinal edges of the strip-like material abut each other on a center line of the inner surface of the rim, and are sewn or bonded to each other. Thus, the cover material is wrapped about the entire steering wheel rim.

Since the inner surface of the rim has a slightly smaller diameter than the outer surface, ruffling is applied to both the longitudinal edges of the strip-like material to conform to the reduced diameter of the inner surface of the rim. Ruffling must be uniform over the entire lengths of the longitudinal edges of the strip-like material, which requires much time and skill, and adds to the cost of covering the steering wheel rim.

Figure 21:
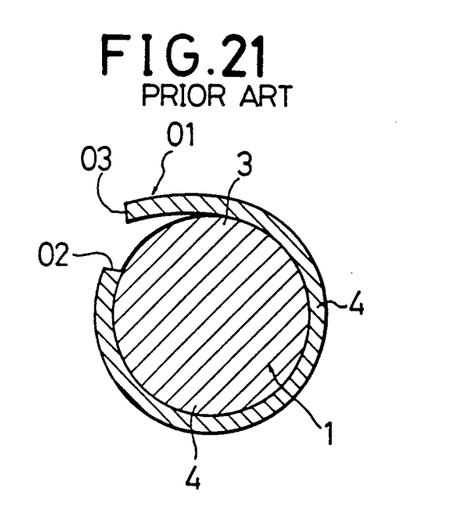
FIG. 21 is a cross-sectional view showing a conventional strip-like material in position to be attached to the steering wheel rim.
Figure 22:
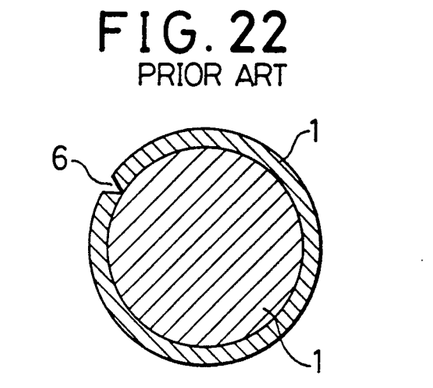
FIG. 22 is a view similar to FIG. 21 showing triangular gaps between the longitudinal edges of the strip-like material illustrated in FIG. 21.

Furthermore, the above-described conventional cover material has the following disadvantage. As shown in FIG. 21 the ends 704 of the strip-like material 701 are cut substantially perpendicularly to edges 702 and 703. Accordingly, when the cover 701 is wrapped around the steering wheel rim a triangular gap 706 results as shown in FIG. 22. Additional time and expense is required to fill the gap 706.

It is an object of the invention to provide a cover material for a steering wheel of a vehicle, which is capable of overcoming the aforesaid disadvantages.

It is another object of the invention to provide a method of manufacturing a cover material for a steering wheel of a vehicle, which is capable of overcoming the aforesaid disadvantages.

SUMMARY OF THE INVENTION

According to the present invention, there is provided a cover for the rim of steering wheel of a vehicle, the steering wheel rim having an outer and an inner peripheral surface, the cover comprising:

a central body portion whose circumferential length is substantially identical with that of the outer circumference of the steering wheel rim; and a pair of side skirts extending radially inwardly respectively from both side edges of the central body portion, wherein the central body portion and the pair of side skirts cooperate with each other to define therein an annular space into which the steering wheel can be fitted, wherein the central body portion and the pair of side skirts have respective circumferential lengths substantially identical with an outer circumference of the steering wheel rim, and wherein ruffling is applied to each of the pair of side skirts along a radially inward edge thereof, to form pleats along the radially inward edge of the side skirt.

With the above arrangement of the invention, the ends of the central body portion, to be abutted against each other the longitudinal side edges and side skirt and the ends of the side skirts are abutted against each other without defining any gaps therebetween. Accordingly, it is not necessary to up the gaps between the side edges and between the peripheral ends as is in the conventional cover material. Thus, it is possible to reduce cost required for fitting the cover material to the steering wheel rim.

According to the invention, there is also provided a method of manufacturing a cover material for a steering wheel of a vehicle, the steering wheel having an inner hub and a rim, the method comprising the steps of:

(a) cutting a material into a first length substantially identical with the circumference of the steering wheel rim, and to a width equal to the cross-sectional circumference of the rim;

(b) ruffling the material along both side edges thereof to form pleats therealong; and (c) forming the first material into a generally rounded shape, the rounded material having an central body portion circumference is substantially identical with that of the outer circumference of the steering wheel rim, and a pair of side skirts extending radially inwardly respectively from both side edges of the central body portion.

wherein the central body portion and the pair of side skirts cooperate with each other to define therein an annular space into which the steering wheel can be fitted, and wherein the central body portion and the pair of side skirts have respective circumferential lengths, substantially identical with an outer circumference of the steering wheel rim.

With the arrangement of the invention, the following advantages can be produced. That is, when the cover material is wrapped about the steering wheel, it is not necessary with to perform such troublesome operations as ruffling the pair of side skirts of the cover material, because ruffling has already been applied. Further, uniform ruffling can easily be applied to the cover material by a ruffling sewing machine along the entire lengths of the side edges of the cover material, without requiring skill. Thus, it is possible to reduce the cost required for wrapping the cover material about the steering wheel.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Various embodiments of the invention will be described below with reference to the accompanying drawings. It should be noted that like or similar components and parts are designated by the same or like reference numerals throughout the description, and the description of the like or similar components and parts will be simplified or omitted to avoid repetition.

First Embodiment

Figure 1:
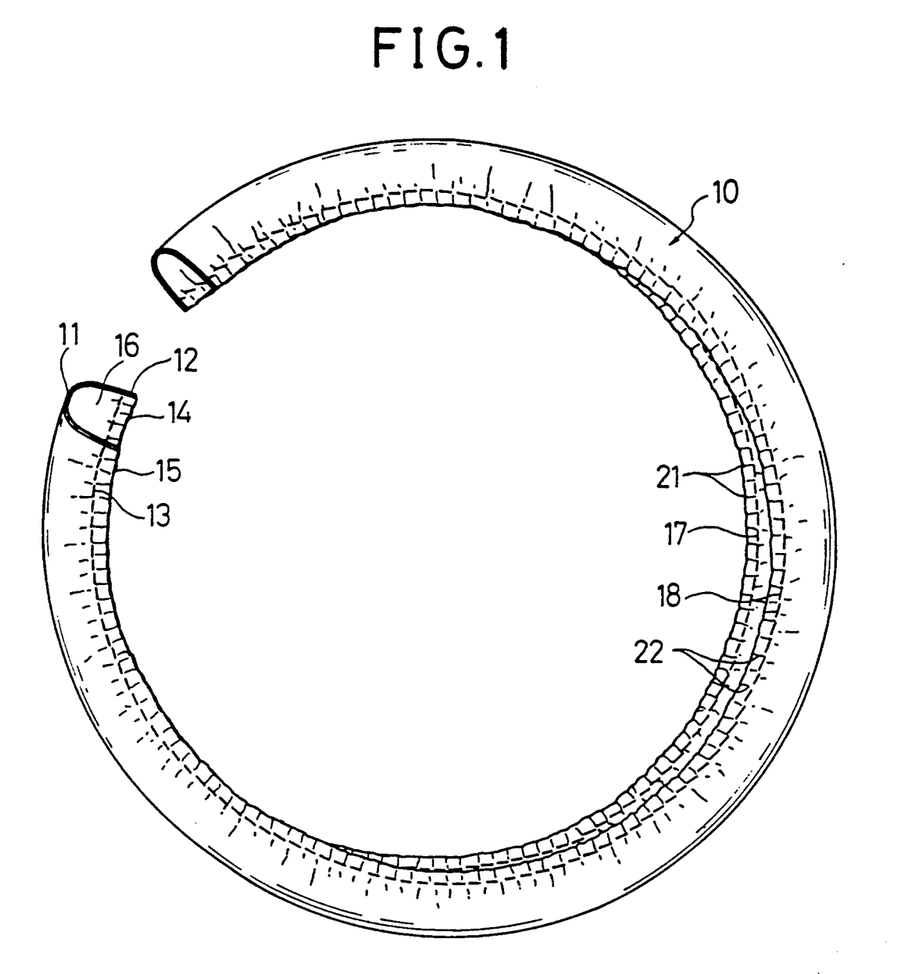
FIG. 1 is a perspective view of a cover according to the first embodiment of the invention, the cover being ruffled along both longitudinal edges, the cover having a U-shaped cross section.

Referring to FIG. 1, there is shown a cover 10 for the rim of a steering wheel 1 (FIG. 20) according to a first embodiment of the invention. The cover 10 comprises an elongate central portion 11 and a pair of integral side skirts 12 and 13 extending from opposite longitudinal edges of central portion 11. Central portion 11 and side skirts 12 and 13 are formable longitudinally to cooperatively define a channel 16 into which the steering wheel 1 can be fitted.

Central portion 11 and side skirts 12 and 13 are substantially equal in length to the outer circumference of the steering wheel rim, which is greater than the inner circumference of the rim. In order to achieve a close, fit of cover 10 to the inner circumference of steering wheel rim 3, a series of uniform pleats 21 and 22 are formed in side skirts 12 and 13 along edges 14 and 15 by ruffling. Edges 14 and 15 are thereby shortened in length to match the inner circumference of steering wheel rim 3. Pleats 21 and 22 are substantially uniform in pitch.

A method of manufacturing cover 10 according to the first embodiment will be described with reference to FIGS. 2 and 3.

Figure 2:
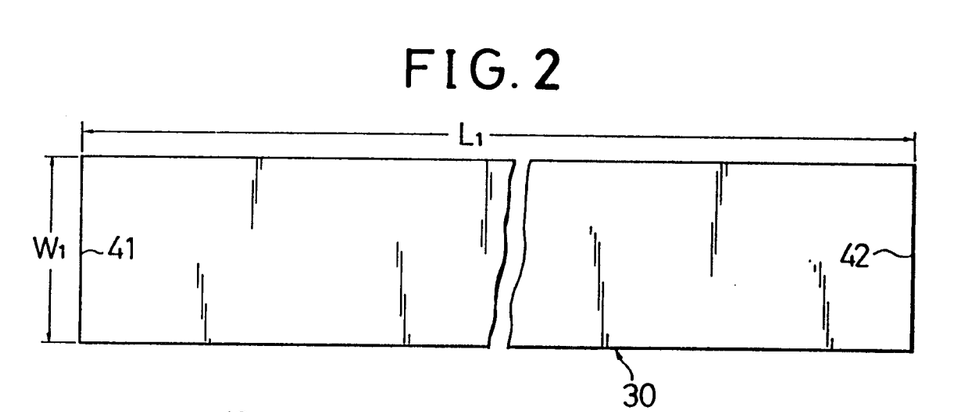
FIG. 2 is a top plan view of a cover illustrated in FIG. 1.
Figure 3:
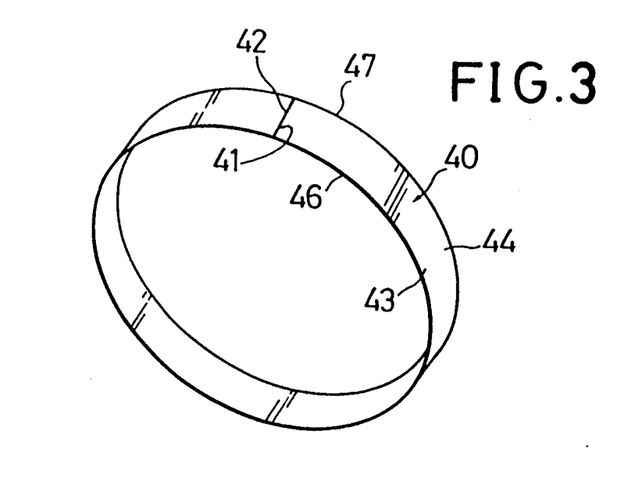
FIG. 3 is a perspective view of a strip of material illustrated in FIG. 2 formed into an annular configuration.

First, as shown in FIG. 2, a material 30 such as natural leather, synthetic leather or cloth is cut to a length substantially identical the outer circumference of the steering wheel rim 3, and to a width sufficient to cover rim 3 so that edges 14 and 15 abut along the inner circumference of rim 3 when cover 10 is fitted thereto. Then, the material 30 is bent to form a generally an annular shape as shown at 40 in FIG. 3, and ends 41 and 42 are bonded together. Pleats 21 and 22 are then formed along the entire length of edges 46 and 47 by means of ruffling sewing machine to reduce the length of edges 46 and 47 to match the inner circumference of rim 3 as described above. A cover 10 is thus formed having a U-shaped cross-section, and pleats 21 and 22 along the length of edges 14 and 15 as shown in FIG. 1.

Figure 4:
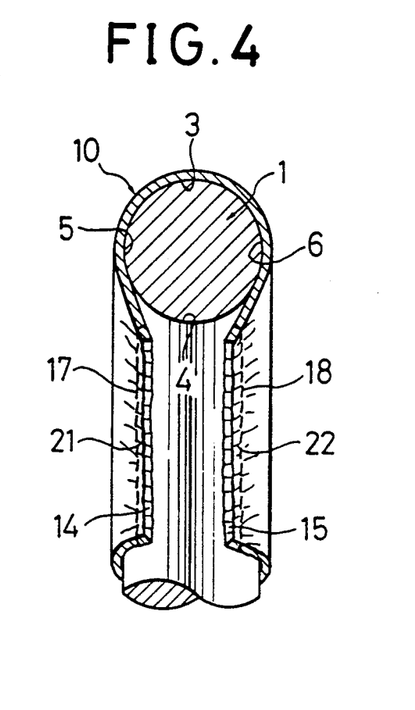
FIG. 4 is a cross-sectional view of a steering wheel which is loosely fitted with the cover illustrated in FIG. 1.
Figure 5:
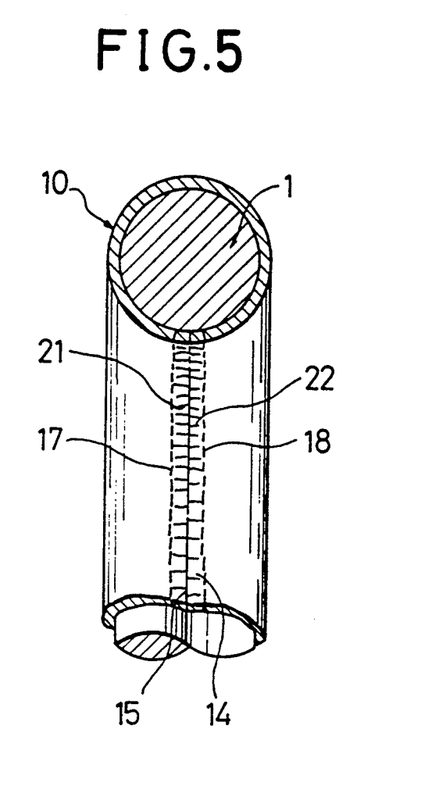
FIG. 5 is a cross-sectional view of a steering wheel rim in which the cover illustrated in FIG. 1 has been attached.

Cover 10 is applied by is fitting steering wheel rim 3 into channel 16, and extending side skirts 12 and 13 inwardly around rim 3 so that side edges 14 and 15 are aligned along inner circumference 4 of steering wheel 1 as shown in FIG. 4. Side edges 14 and 15 are simultaneously drawn together to abut one another manually or by means of an automatic wrapping apparatus as disclosed in co-pending application Ser. No. 07/750,560 now U.S. Pat. No. 5,240,547 (Attorney's docket No. 6063-16), and fixed in place by an adhesive previously applied to the rim and or the cover. Alternatively, side edges 14 and 15 are drawn inwardly to their abutting positions and fixed in place one at a time. In this manner, as shown in FIG. 5, the cover material 10 is wrapped about the entire steering wheel 1.

A cover 10 according to the first embodiment represents a significant improvement over known covers in that the ruffling of edges 14 and 15 to form pleats 21 and 22 gives the appearance of a high quality cover which has been hand sewn in place. this effect may be enhanced by a binding thread extending between front threads of the ruffling or between rear threads of the rufflings. Alternatively, a binding thread may alternatively extend between the front and rear threads.

Second Embodiment

Figure 6:
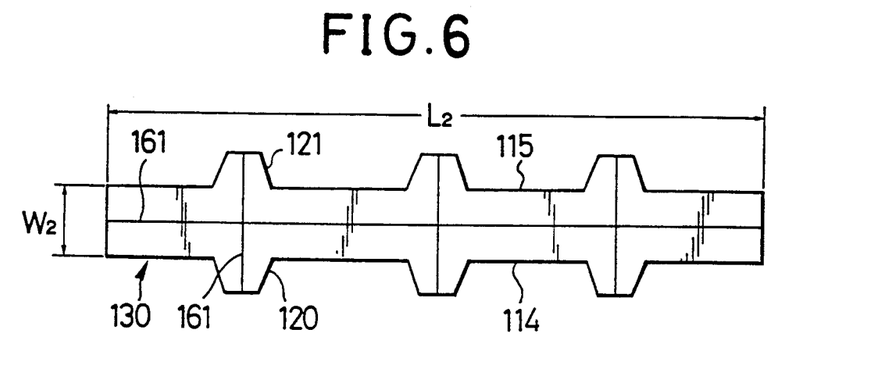
FIG. 6 a top plan view of a strip-like material to be formed into a cover, according to a second embodiment of the invention.

Referring next to FIG. 6, there is shown a cover for the steering wheel 1 illustrated in FIG. 20, according to a second embodiment of the invention.

A material is die cut into a strip-like material 130 which is stretchable by a predetermined elongation percentage. Material 130 is cut to a length $L_2$ shorter than the outer circumference of the steering wheel rim 3 by an amount equal to an elongation percentage of the strip-like material 130, and a width $W_2$ which is less than the cross-sectional circumference of steering wheel rim 3 by an elongation percentage of the strip-like material 130. Material 130 has a plurality of outwardly extending lugs 120 and 121 for being wrapped about the spokes 7 of the steering wheel 1.

Figure 7:
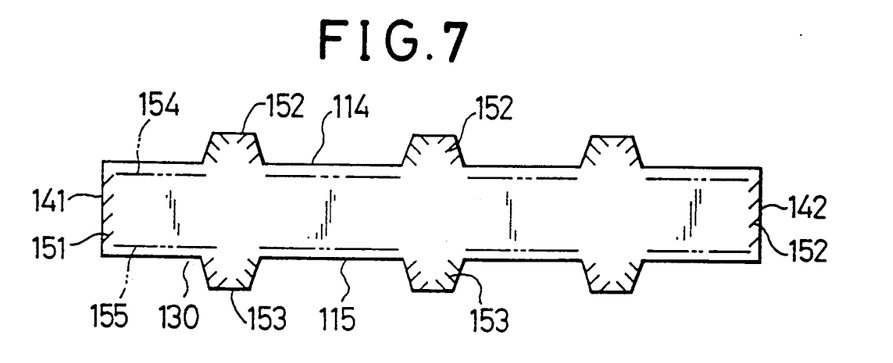
FIG. 7 is a view better showing the tapered longitudinal ends and side edges of the strip-like material illustrated in FIG. 6.
Figure 8:
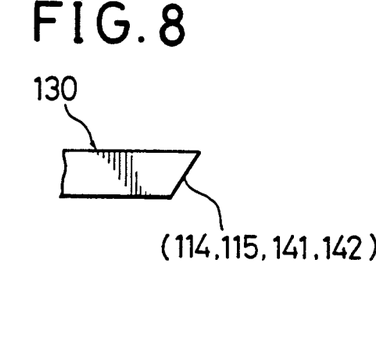
FIG. 8 is a cross-sectional view of the longitudinal edges illustrated in FIG. 6 which are tapered to define an acute angle.
Figure 9:
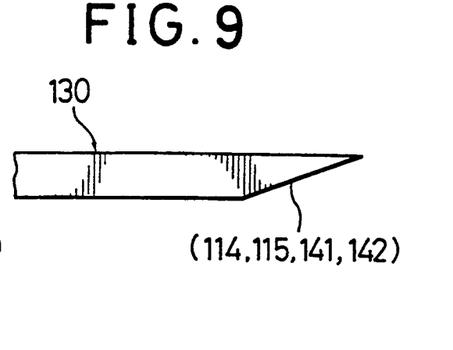
FIG. 9 is a cross-sectional view of the longitudinal edges of the strip-like material illustrated in FIG. 6, which are tapered to define an acute angle.

As shown in FIGS. 7-9, longitudinal ends 141 and 142, and lateral side edges 114 and 115 are tapered at 151, 152, 153, 154 so that when material 130 is formed into a configuration as illustrated in FIG. 1, substantially no gaps remain between both the longitudinal ends 141 and 142 of the strip-like material 130 and between both the lateral side edges 114 and 115 thereof. As shown in FIG. 8, each of the longitudinal ends 141 and 142 of the strip-like material 130 and each of the lateral side edges 114 and 115 thereof may be so tapered as to define an acute angle. Alternately, as shown in FIG. 9, each of the longitudinal ends 141 and 142 of the strip-like material 130 and each of the lateral side edges 114 and 115 thereof may be so tapered as to define an obtuse angle.

It will be seen that at least one of the longitudinal ends 141 and 142 of the strip-like material 130 is formed into a configuration as illustrated in FIG. 1, substantially no gaps are defined between both the longitudinal ends 141 and 142 of the strip-like material 130 and between both the lateral side edges 114 and 115 thereof.

Furthermore, as shown in FIG. 8, inking lines 154 and 155 are applied to and along the lateral side edges 114 and 115 as well as peripheral edges of the lugs 120 and 121 of the strip-like material 130 by means of the cutting dies, and are used as marks for covering the steering wheel 1 with the strip-like material 130 without slipping off or shifting.

Figure 10:
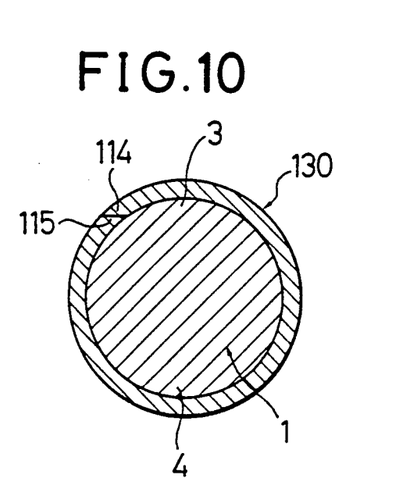
FIG. 10 is a cross-sectional view showing the strip-like material illustrated in FIG. 6 wrapped about the steering wheel rim.

With the above arrangement according to the second embodiment, the steering wheel 1 is covered with the strip-like material 130 by adhesives. Subsequently, the longitudinal ends 141 and 142 are so pulled as to be abutted against each other. Further, the side edges 114 and 115 are also pulled so as to be abutted against each other. Then, as shown in FIG. 10, the strip-like material 130 is bonded to the steering wheel 1 under such a condition that the strip-like material 130 is in intimate or close contact with the steering wheel 1 from the outer peripheral section 3 toward the inner peripheral section 4. Simultaneously, the side edges 114 and 115 can be abutted against each other without any gap being defined thereat, and without any steps being formed.

Figure 11:
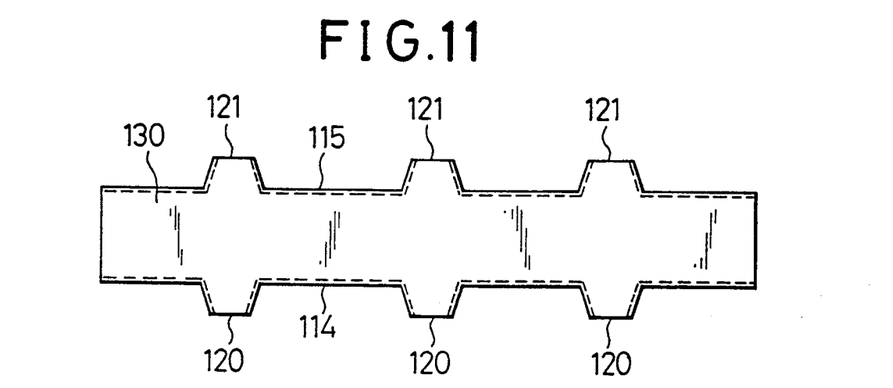
FIG. 11 a top plan view of a strip-like material to be formed into a cover, according to a modification of second embodiment of the invention illustrated in FIGS. 6 through 10.

Before or after the strip-like material 130 is formed into the annular material, ruffling similar to the above-described ruffling may be applied to the strip-like material 130 along the side edges 114 and 115 and along both side edges of the lugs 120 and 121, as shown in FIG. 11.

Other Modifications

Figure 12:
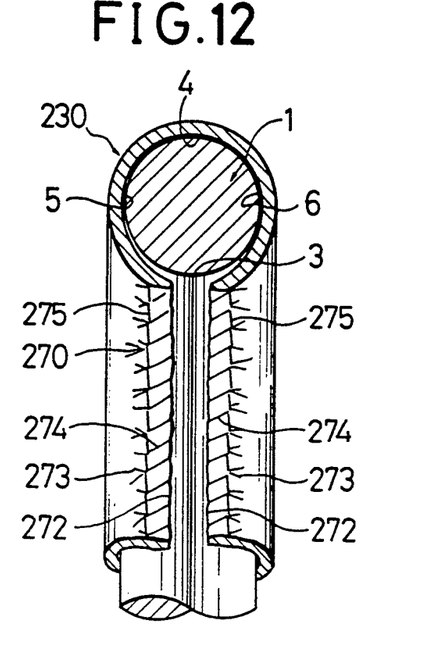
FIG. 12 is a cross-sectional view of a cover according to the present invention showing details of the seam of the cover material.
Figure 13:
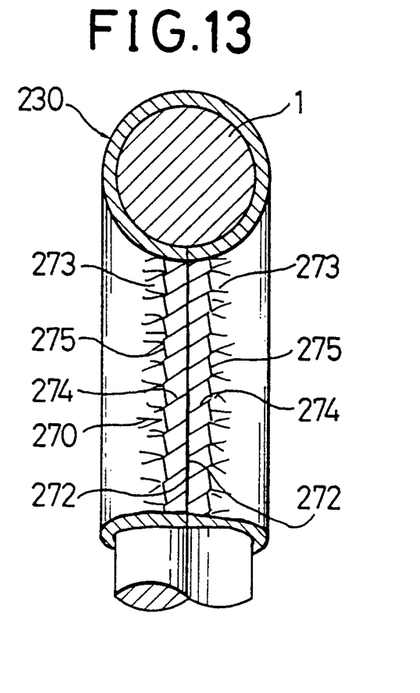
FIG. 13 a view similar to FIG. 12 showing a cover attached to the steering wheel rim.

As shown in FIGS. 12 and 13, ruffling 270 may comprise a first ordinary sewing seam having a plurality of generally aligned seam sections 275 inward of edge 272, and a second seam having a plurality of seam sections 274 extending from the first sewing means to the radially inward edge 272 of the side skirt 273. The seam sections 274 of the second seam are inclined in the same direction with respect to the plane including the axis 2 of the steering wheel 1. Seams including the first and second seams are called "lock seam".

Figure 14:
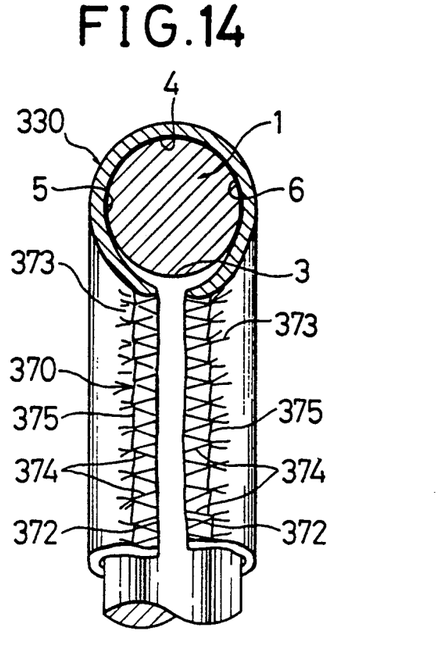
FIG. 14 is a fragmentary cross-sectional view showing details of the seam of the cover.
Figure 15:
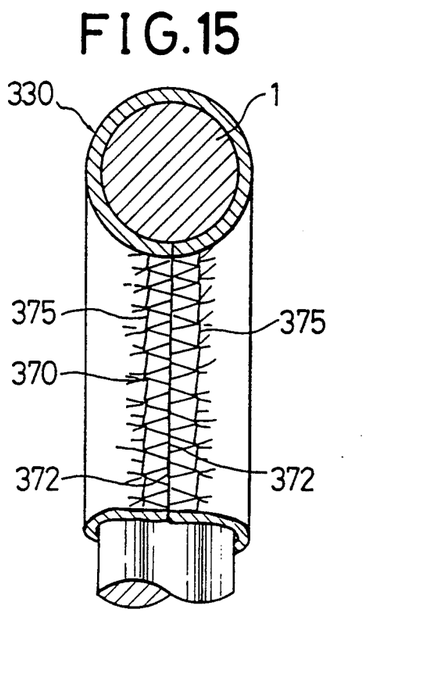
FIG. 15 a view similar to FIG. 14 showing a cover illustrated in FIG. 14 attached to the steering wheel rim

Alternatively, as shown in FIGS. 14 and 15, ruffling 370 may comprise a first ordinary sewing seam having a plurality of seam sections 375 extending along a line spaced by a predetermined distance from a radially inward edge 372 of each of a pair of side skirts 373 of an annular material 330, and a second zigzag seam having a plurality of seam sections 374 extending from the first ordinary sewing seam to the radially inward edge 372 of the side skirt 373. Seams including the first and second seams are called "staggered seams".

Figure 16:
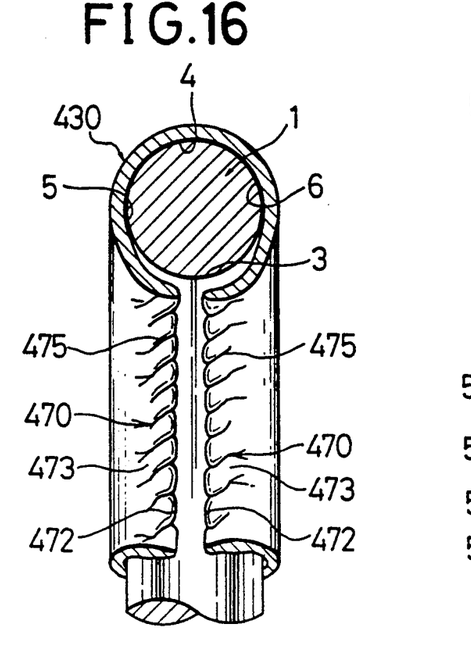
FIG. 16 is a fragmentary cross-sectional view showing details of the seam applied to the cover material.
Figure 17:
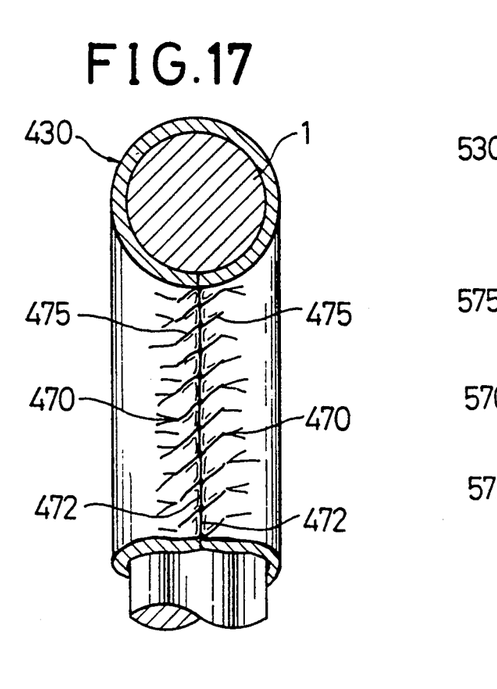
FIG. 17 is a view similar to FIG. 16, but showing a condition in which wrapping of the cover material illustrated in FIG. 16 about the steering wheel has been completed.

Alternatively, as shown in FIGS. 16 and 17, ruffling 470 may comprise a seam having a plurality of seam sections extending from a line spaced by a predetermined distance from a radially inward edge 472 of each of a pair of side skirts 473 of an annular material 430 to the radially inward edge 472 of the side skirt 473. The seam sections 475 of the seams are inclined in their respective directions identical with each other with respect to the plane including the axis 2 of the steering wheel 1.

Figure 18:
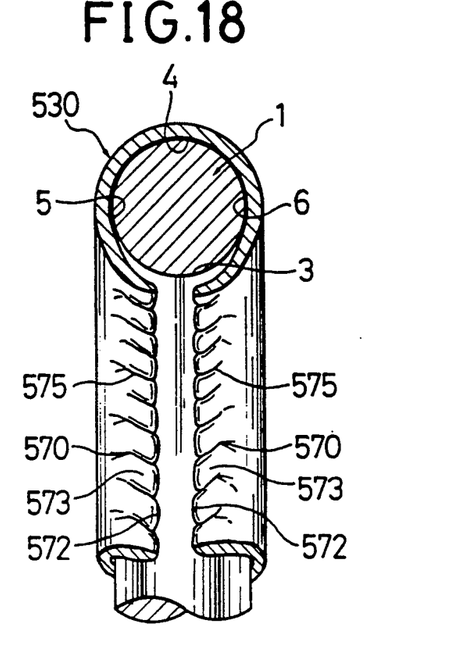
FIG. 18 is a fragmentary cross-sectional view showing different seam sections of the seam applied to the cover material.
Figure 19:
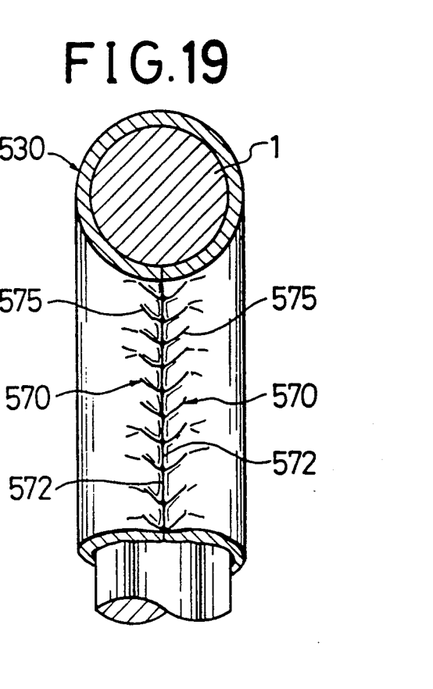
FIG. 19 a view similar to FIG. 18, but showing a condition in which wrapping of the cover material illustrated in FIG. 18 about the steering wheel has been completed.

Alternatively, as shown in FIGS. 18 and 19, ruffling 570 may comprise a seam having a plurality of seam sections 572 extending from a line spaced by a predetermined distance from a radially inward edge 572 of each of a pair of side skirts 573 of an annular material 530 to the peripheral edge 572 of the side skier 572. The seam sections 575 of the seam in one of the pair of side skirts 573 are inclined in their respective directions opposite to those of the seam sections 575 of the seam in the other side skirt 573.

In the cover material wrapped about the steering wheel, it looks that seam sections of the seam due to ruffling serve also as a seam by which the side edges of the cover material are sewn together. Particularly, in the cover material to which the ruffling is applied by the seam sections, the seam section are cut obliquely into the thick walls of the side edges so that the surface of the strip-like material rises at each section between the seam sections. The seam sections are not in contact with operator's hands. Thus, the cover material becomes pleasant to the touch.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. For use with a steering wheel of a vehicle, said steering wheel including a central hub and a rim, said rim having an outer and an inner peripheral surface, said cover comprising:

An elongate body having a central portion having a first length adapted substantially identical with the circumference of the outer peripheral surface of a steering wheel rim; and a pair of side skirts extending radially inwardly from respective longitudinal edges of said central body portion, each said side skirt having a distal longitudinal edge comprising permanent pleats sewn therein;

each said permanently pleated distal edge having a length adapted to be substantially equal to the inner circumference of said steering wheel rim;

said central body portion and said pair of side skirts cooperatively defining a cover for encasing said steering wheel rim, said cover having a transverse width adapted transversely encircle the steering wheel rim.

2. A cover according to claim 1, wherein said pleats are substantially the same in pitch as each other.

3. A cover according to claim 1 wherein the central body portion has a second length which is adapted to be shorter than the circumference of the outer peripheral surface of said steering wheel rim by an elongation percentage of said elongate body.

4. A cover according to claim 1 having a total width which is adapted to be shorter than the cross-sectional circumference of said steering wheel rim by an elongation percentage of said cover.

5. A cover according to claim 1 wherein a plurality of lugs extend radially inwardly from the distal longitudinal edge of each said side skirt adapted to be about spokes of said steering wheel.

6. A cover according to claim 1, wherein each said ruffled edge comprises a first ordinary sewing seam having a plurality of seam sections extending along a line spaced inwardly of said distal longitudinal edge by a predetermined distance, and a second seam having a plurality of seam sections extending from said first sewing seam to the distal longitudinal edge, the seam sections of said second seam inclined with respect to adapted to be including the said steering wheel rim.

7. A cover according to claim 1, wherein each said ruffled edge comprises a first ordinary sewing seam having a plurality of seam sections extending along a line spaced by a predetermined distance from said distal longitudinal edge, and a second zigzag seam having a plurality of seam sections extending from said first ordinary sewing seam to said distal longitudinal edge.

8. A cover according to claim 1, wherein each said ruffled edge comprises a seam having a plurality of seam sections extending from a longitudinal seam line spaced inwardly of said distal longitudinal edge by a predetermined distance, each said seam section of said seam being adapted to be similarly inclined with respect to a plane including said steering wheel rim.

9. A cover according to claim 1, wherein each said ruffled edge comprises a seam having a plurality of seam sections extending from a longitudinal seam line spaced inwardly of said distal longitudinal edge by a predetermined distance, and wherein the seam sections of said seam in a first of said pair of side skirts is inclined in the opposite direction of the seam sections of said seams in a second of said pair of side skirts.

10. A cover according to claim 1, wherein said central body portion and said pair of side skirts are integral with each other, and are made of one of natural leather, synthetic leather and cloth.

11. For use with a steering wheel of a vehicle, said steering wheel including a central hub and a rim, said rim having an outer and an inner peripheral surface, a cover comprising:

an elongate body having a central portion having a first length adapted to be substantially identical with the circumference of the outer peripheral surface of said steering wheel rim; and a pair of side skirts extending radially inwardly from respective longitudinal edges of said central body portion, each said side skirt having a distal longitudinal edge comprising permanent pleats sewn therein;

each said permanently pleated distal edge having a length adapted to be substantially equal to the inner circumference of said steering wheel rim;

said central body portion and said pair of side skirts cooperatively defining a cover for encasing said steering wheel rim, said cover having a transverse width adapted to transversely encircle the steering wheel rim; and wherein at least one end of said central body portion, at least one end of each of said cover and the distal longitudinal edge of at least one of said side skirts are tapered so that substantially no gaps are defined between peripheral ends of said cover and between the distal edges of the respective side skirts when said cover is installed on said steering wheel.

12. For use with a steering wheel of a vehicle, said steering wheel including a central hub and a rim, said rim having an outer and an inner peripheral surface, said cover comprising:

an elongate body having a central portion having a first length selected to be substantially identical with the circumference of the outer peripheral surface of said steering wheel rim; and a pair of side skirts extending radially inwardly from respective longitudinal edges of said central body portion, each said side skirt having a distal longitudinal edge comprising permanent pleats sewn therein;

each said permanently pleated distal edge having a length selected to be substantially equal to the inner circumference of said steering wheel rim;

said central body portion and said pair of side skirts cooperatively defining a cover for encasing said steering wheel rim, said cover having a transverse width selected so that said cover transversely encircles the steering wheel rim; and wherein at least one end of said central body portion, at least one end of each of said cover and the distal longitudinal edge of at least one of said side skirts are tapered so that substantially no gaps are defined between peripheral ends of said cover and between the distal edges of the respective side skirts when said cover is installed on said steering wheel; and at least one peripheral end of said central body portion, said at least one peripheral end of each of said pair of side skirts and the distal longitudinal edge of at least one of said pair of side skirts tapered so as to define an acute angle.

13. For use with a steering wheel of a vehicle, said steering wheel including a central hub and a rim, said rim having an outer and an inner peripheral surface, said cover comprising:

an elongate body having a central portion having a first length selected to be substantially identical with the circumference of the outer peripheral surface of said steering wheel rim; and a pair of side skirts extending radially inwardly from respective longitudinal edges of said central body portion, each said side skirt having a distal longitudinal edge comprising permanent pleats sewn therein;

each said permanently pleated distal edge having a length selected to be substantially equal to the inner circumference of said steering wheel rim;

said central body portion and said pair of side skirts cooperatively defining a cover for encasing said steering wheel rim, said cover having a transverse width selected so that said cover transversely encircles the steering wheel rim;

at least one end of said central body portion, at least one end of each of said cover and the distal longitudinal edge of at least one of said side skirts are tapered so that substantially no gaps are defined between peripheral ends of said cover and between the distal edges of the respective side skirts when said cover is installed on said steering wheel; and at least one peripheral end of said central body portion, at least one peripheral end of each of said pair of side skirts and the distal longitudinal edge of at least one of said pair of side skirts are so tapered as to defined an obtuse angle.

14. For use with a steering wheel of a vehicle, said steering wheel including a central hub and a rim, said rim having an outer and an inner peripheral surface, said cover comprising:

an elongate body having a central portion having a first length selected to be substantially identical with the circumference of the outer peripheral surface of said steering wheel rim; and a pair of side skirts extending radially inwardly from respective longitudinal edges of said central body portion, each said side skirt having a distal longitudinal edge comprising permanent pleats sewn therein;

each said permanently pleated distal edge having a length selected to be substantially equal to the inner circumference of said steering wheel rim;

said central body portion and said pair of side skirts cooperatively defining a cover for encasing said steering wheel rim, said cover having a transverse width selected so that said cover transversely encircles the steering wheel rim; and both peripheral ends of said central body portion, both peripheral ends of each of said pair of side skirts and the distal longitudinal edge of each of said pair of side skirts being tapered such that substantially no gaps are defined between both the peripheral ends of said annular strip body, between both peripheral ends of each of said pair of side skirts and between the distal longitudinal edges of the respective side skirts when said cover is installed on said steering wheel.

15. A method of manufacturing a cover for a steering wheel of a vehicle, said steering wheel having an inner hub and a rim, said rim including an outer and an inner peripheral surface, said method comprising the steps of:

(a) cutting a material into an elongate, planar shape having a length adapted to be substantially equal to the circumference of said outer peripheral surface of said rim, and having a width adapted to be substantially equal to a cross-sectional circumference of said rim;

(b) forming permanently sewn pleats along said first and second longitudinal edges of said material;

(c) forming said material into a generally circular configuration defining a central body portion having a circumference selected to be substantially equal to the circumference of the outer peripheral surface of said rim, and further defining a pair of side skirts extending radially inwardly from first and second longitudinal side edges of said central body portion, said elongate body portion and said pair of side skirts cooperatively defining an annular cover for encasing said steering wheel rim, and said cover having a length selected to be substantially identical with an outer peripheral length of said steering wheel rim.

16. A method according to claim 15 further comprising the step of forming said pleats substantially the same pitch as each other.

17. A method according to claim 15 further comprising the step of forming the said central body portion with a second length which is adapted to be shorter than the circumference of the outer peripheral surface of said steering wheel rim by an elongation percentage of said elongate body.

18. A method according to claim 15, further comprising the step of forming said side skirts with a second length which is adapted to be shorter than the outer circumference of said steering wheel rim by an elongation percentage of said side skirts.

19. A method according to claim 15,, a plurality of lugs extending radially inwardly from the distal longitudinal edge of each said side skirt adapted to be wrapped about spokes of said steering wheel.

20. A method according to claim 15 further comprising the step of forming ruffled a first ordinary sewing seam having a plurality of seam sections extending along a line spaced inwardly of said distal longitudinal edge by a predetermined distance, and a second seam having a plurality of seam sections extending from said first sewing seam to the distal longitudinal edge, the seam sections of said second seam being inclined with respect to the plane including the said steering wheel rim.

21. A method according to claim 15 further comprising the step of forming a first ordinary sewing seam having a plurality of seam sections extending along a line spaced by a predetermined distance from said distal longitudinal edge, and a second zigzag seam having a plurality of seam sections extending from said first ordinary sewing seam to said distal longitudinal edge.

22. A method according to claim 15 further comprising the step of forming a seam having a plurality of seam sections extending from a line spaced inwardly away from said distal longitudinal edge by a predetermined distance, each said seam section of said seam being adapted to be similarly inclined with respect to a plane including said steering wheel rim.

23. A method according to claim 15 further comprising the step of forming seam having a plurality of seam sections extending from a line spaced inwardly away from said distal longitudinal edge by a predetermined distance, and forming the seam sections of said seam in a first of said pair of side skirts being inclined in the opposite direction of the seam sections of said seams in a second of said pair of side skirts.

24. A method according to claim 15 further comprising the step of forming central body portion and said pair of side skirts integral with each other, and being made of one of natural leather, synthetic leather and cloth.

25. A method of manufacturing a cover for a steering wheel of a vehicle, said steering wheel having an inner hub and a rim, said rim including an outer and an inner peripheral surface, said method comprising the steps of:
    (a) cutting a material into an elongate, planar shape having a length adapted to be substantially equal to the circumference of said outer peripheral surface of said rim, and having a width adapted to be substantially equal to a cross-sectional circumference of said rim;
    (b) forming said material into a generally circular configuration defining a central body portion having a circumference adapted to be substantially equal to the circumference of the outer peripheral surface of said rim, and further defining a pair of side skirts extending radially inwardly from first and second longitudinal side edges of said central body portion,
    (c) forming permanently sewn pleats along first and second longitudinal edges of said material,
    said elongate body and said pair of side skirts cooperatively defining an annular cover for encasing said steering wheel rim, and
    said cover having a length adapted to be substantially identical with an outer peripheral length of said steering wheel rim.

26. A method of manufacturing a cover for a steering wheel of a vehicle, said steering wheel having an inner hub and a rim, said rim including an outer and an inner peripheral surface, said method comprising the steps of:
    cutting a material into an elongate, planar shape having a length adapted to be substantially equal to the circumference of said outer peripheral surface of said rim, and having a width adapted to be substantially equal to a cross-sectional circumference of said rim;
    forming permanently sewn pleats along first and second longitudinal edges of said material;
    forming said material into a generally circular configuration defining a central body portion having a circumference adapted to be substantially equal to the circumference of the outer peripheral surface of said rim, and further defining a pair of side skirts extending radially inwardly from first and second longitudinal side edges of said central body portion,
    said elongate body portion and said pair of side skirts cooperatively defining an annular cover for encasing said steering wheel rim, and
    said cover having a length adapted to be substantially identical with an outer peripheral length of said steering wheel rim; and
    tapering at least one end of said central body portion, at least one end of each of said side skirts and the radially inward edge of at least one of said side skirts are tapered such that substantially no gaps are defined between the peripheral ends of said central body portion, between the peripheral ends of each of said side skirts, and between the distal longitudinal edges of the respective side skirts when said cover is installed on said steering wheel.

27. A method of manufacturing a cover for a steering wheel of a vehicle, said steering wheel having an inner hub and a rim, said rim including an outer and an inner peripheral surface, said method comprising the steps of:
    cutting a material into an elongate, planar shape having a length adapted to be substantially equal to the circumference of said outer peripheral surface of said rim, and having a width adapted to be substantially equal to a cross-sectional circumference of said rim;
    forming permanently sewn pleats along said first and second longitudinal edges;
    forming said material into a generally circular configuration defining a central body portion having a circumference adapted to be substantially equal to the circumference of the outer peripheral surface of said rim, and further defining a pair of side skirts extending radially inwardly from first and second longitudinal side edges of said central body portion,
    said elongate body portion and said pair of side skirts cooperatively defining an annular cover for encasing said steering wheel rim, and
    said cover having a length adapted to be substantially identical with an outer peripheral length of said steering wheel rim;
    tapering at least one end of said central body portion, at least one end of each of said side skirts and the radially inward edge of at least one of said side skirts are tapered such that substantially no gaps are defined between the peripheral ends of said central body portion, between the peripheral ends of each of said side skirts, and between the distal longitudinal edges of the respective side skirts when said cover is installed on aid steering wheel; and
    tapering said at least one the peripheral end of said central body portion, said at least one peripheral ends of each of said pair of side skirts and the distal longitudinal edge of at least one of said pair of side skirts are so as to define an acute angle.

28. A method of manufacturing a cover for a steering wheel of a vehicle, said steering wheel having an inner hub and a rim, said rim including an outer and an inner peripheral surface, said method comprising the steps of:
    cutting a material into an elongate, planar shape having a length adapted to be substantially equal to the circumference of said outer peripheral surface of said rim, and having a width adapted to be substantially equal to a cross-sectional circumference of said rim;
    forming permanently sewn pleats along first and second longitudinal edges of said material;
    forming said material into a generally circular configuration defining a central body portion having a circumference adapted to be substantially equal to the circumference of the outer peripheral surface of said rim, and further defining a pair of side skirts extending radially inwardly from first and second longitudinal side edges of said central body portion,
    said elongate body portion and said pair of side skirts cooperatively defining an annular cover for encasing said steering wheel rim, and
    said cover having a length adapted to be substantially identical with an outer peripheral length of said steering wheel rim;
    tapering at least one end of said central body portion, at least one end of each of said side skirts and the radially inward edge of at least one of said side skirts are tapered such that substantially no gaps are defined between the peripheral ends of said central body portion, between the peripheral ends of each of said side skirts, and between the distal longitudinal edges of the respective side skirts when said cover is installed on said steering wheel;

tapering said at least one peripheral end of said central body portion, at least one peripheral end of each of said pair of side skirts and the distal longitudinal inward edge of at least one of said pair of side skirts are so as to define an obtuse angle.

29. A method of manufacturing a cover for a steering wheel of a vehicle, said steering wheel having an inner hub and a rim, said rim including an outer and an inner peripheral surface, said method comprising the steps of;

cutting a material into an elongate, planar shape having a length adapted to be substantially equal to the circumference of said outer peripheral surface of said rim, and having a width adapted to be substantially equal to a cross-sectional circumference of said rim;

forming permanently sewn pleats along said first and second longitudinal edges;

forming said material into a generally circular configuration defining a central body portion having a circumference adapted to be substantially equal to the circumference of the outer peripheral surface of said rim, and further defining a pair of side skirts extending radially inwardly from first and second longitudinal side edges of said central body portion, said elongate body portion and said pair of side skirts cooperatively defining an annular cover for encasing said steering wheel rim, and said cover having a length adapted to be substantially identical with an outer peripheral length of said steering wheel rim; and tapering both peripheral ends of said central body portion, both peripheral ends of each of said pair of side skirts and the distal longitudinal edges of said pair of respective side skirts such that substantially no gaps is defined between both the peripheral ends of said annular strip body, between both peripheral ends of each of said pair of side skirts and between the distal longitudinal edges of the respective side skirts when said cover is installed on said steering wheel.

* * * * *